(12) United States Patent
Knowles

(10) Patent No.: US 6,952,339 B1
(45) Date of Patent: Oct. 4, 2005

(54) TANTALUM CAPACITOR CASE WITH INCREASED VOLUMETRIC EFFICIENCY

(76) Inventor: Todd Knowles, 21421 N. 14$^{th}$ Ave., Phoenix, AZ (US) 85027

( * ) Notice: Subject to any disclaimer, the term of this patent is extended or adjusted under 35 U.S.C. 154(b) by 69 days.

(21) Appl. No.: 10/846,267

(22) Filed: May 13, 2004

(51) Int. Cl.$^7$ ................................................. H01G 9/00
(52) U.S. Cl. ....................... 361/528; 361/508; 361/509; 361/516; 361/518; 361/519; 361/523; 29/25.03
(58) Field of Search ................................. 361/523, 508, 361/509, 516, 518, 519, 520, 524, 525, 528, 529, 537, 536; 29/25.03

(56) References Cited

U.S. PATENT DOCUMENTS

| | | | | |
|---|---|---|---|---|
| 4,065,636 A | * | 12/1977 | Herczog | 174/52.3 |
| 4,479,168 A | * | 10/1984 | Green, Jr. | 361/518 |
| 5,825,611 A | * | 10/1998 | Pozdeev | 361/524 |
| 5,926,362 A | * | 7/1999 | Muffoletto et al. | 361/503 |
| 6,791,821 B1 | * | 9/2004 | Monnett | 361/509 |

* cited by examiner

*Primary Examiner*—Dean A. Reichard
*Assistant Examiner*—Nguyen T. Ha
(74) *Attorney, Agent, or Firm*—Schmeiser Olsen & Watts, LLP

(57) ABSTRACT

A capacitor and a method for assembling a capacitor. A capacitor is assembled from a case, which contains an anode that is electrically insulated from the case by isolators. A washer is placed above the anode. This washer transfers force from a capacitor cap to the isolators and anode, securing the anode in place. A cap is placed on the case. The cap may be shaped as a toroid with an outer and an inner annular wall. The annular walls may meet at the top and have an opening at the bottom creating a cap cavity in order to store electrolyte or other materials in the cap. The cap also supports a glass seal that insulates the lead tube and lead wire coming from the anode. Once assembled, the capacitor is filled with electrolyte. A weld extends around the cap to secure the cap to the case. The weld may be administered from the top of the capacitor.

17 Claims, 4 Drawing Sheets

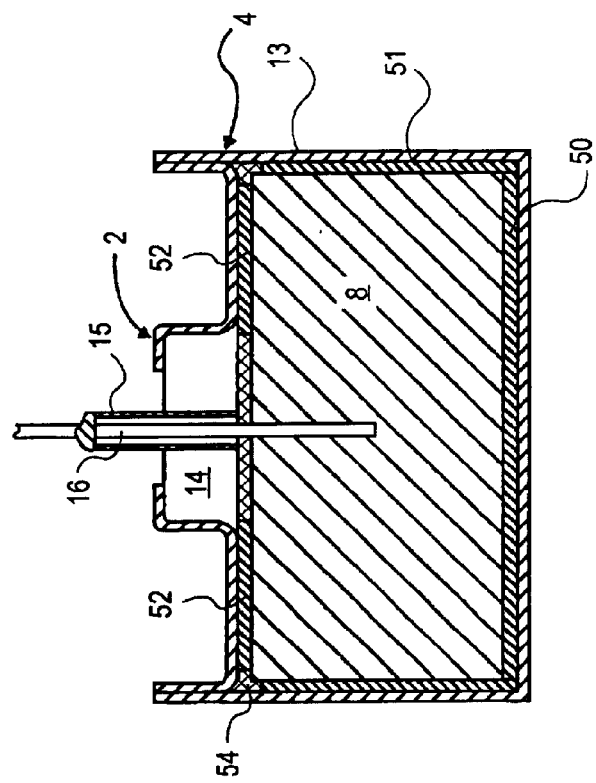
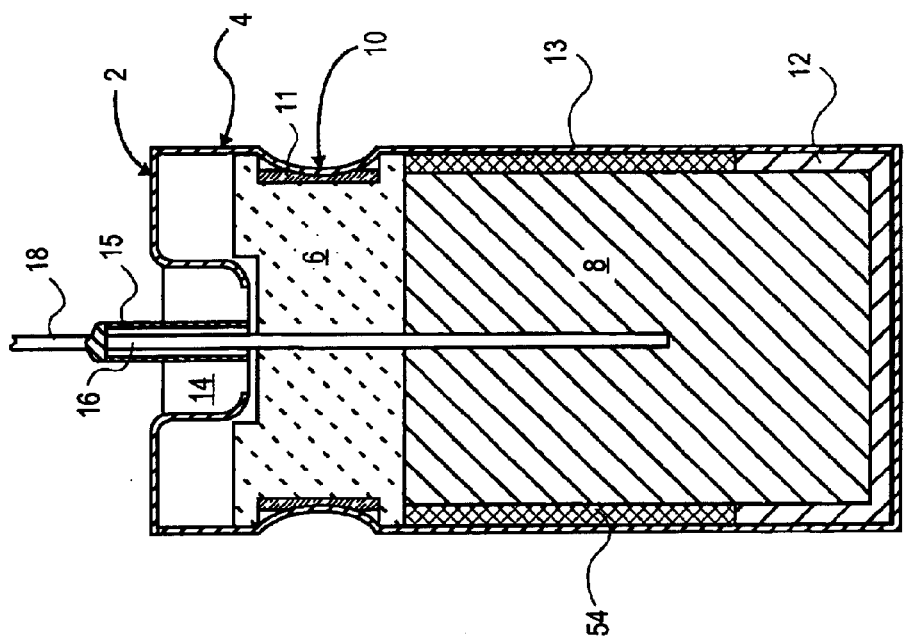
FIG. 2 (PRIOR ART)
FIG. 1 (PRIOR ART)

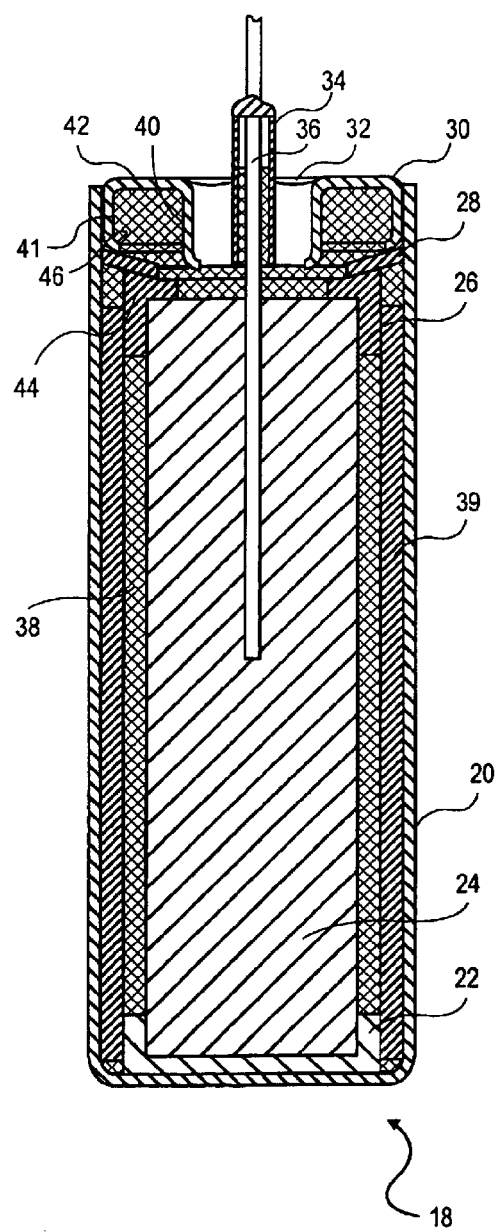
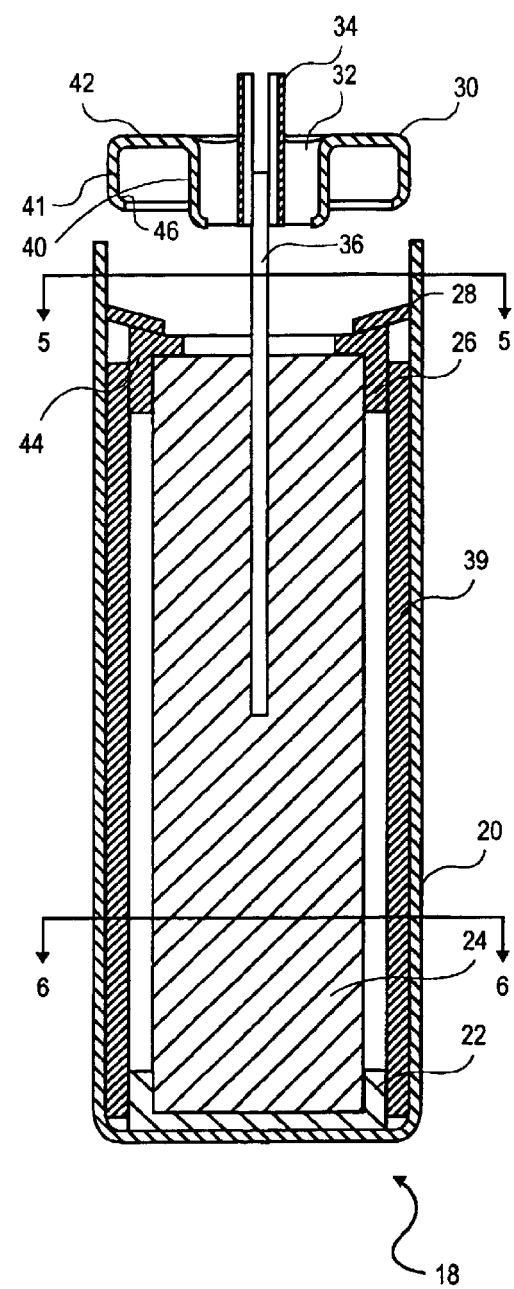
FIG. 3  FIG. 4

TANTALUM CAPACITOR CASE WITH INCREASED VOLUMETRIC EFFICIENCY

BACKGROUND OF THE INVENTION

1. Technical Field

This invention generally relates to a tantalum capacitor case that increases the electrolyte volume of the standard size case, and to a method for assembling the tantalum capacitor.

2. Background Art

There are at least two common conventional tantalum electrolytic capacitor configurations. The first configuration is illustrated by FIG. 1. The capacitor assembly is contained in a case 13 having a height greater than its diameter. The case 13 contains an isolator 12, which is formed from an electrically insulative material and is shaped so that it may receive a tantalum anode 8. The isolator 12, as shown in FIG. 1, is a flat disk of insulative material that sits under the anode 8 and prevents the anode 8 from coming into contact with the case 13. The isolator 12 also comprises a ring of insulative material that fits down around the sides of the anode 8. The isolator 12 may also be arranged so that legs on the isolator 12 extend upward and allow the anode 8 to be placed inside them.

With the anode 8 in place, the case 13 is filled with electrolyte. A plug 6, which is typically formed from Teflon due to its resilience and resistance to electrolyte, has an 'O' ring 11 placed around it. The plug 6 and the 'O' ring 11 are then placed on top of the anode 8. The case 13 is then crimped around the plug 6 and the 'O' ring 11 with an annular crimp 10. This crimp 10 around the 'O' ring 11 forms a seal and prevents the electrolyte from leaking beyond the plug 6. A cap 2 is then placed on top of the case 13. The cap 2 must be aligned with the top of the case 13 in order to create a second seal over the end of the case 13. The cap 2 is then welded into place with a weld around the edge of the cap 2 from the side. The cap 2, which was constructed prior to attachment, contains a glass insulative seal 14. The seal 14 contains a lead tube 15, which allows a lead 16 from the anode 8 to extend through the cap 2. The lead tube is sealed off by a weld. An extension lead 18 formed from a metal alloy such as tin-coated copper or tin-coated nickel is then welded to the sealed lead tube 15. A second lead (not shown) is conventionally welded to the bottom of the case 13 and acts as the cathode lead.

The second conventional tantalum capacitor configuration is illustrated in FIG. 2. The capacitor is contained in a case 13 having a height less than its diameter. An isolator 50 is placed in the bottom of the case 13. This isolator 50 is simply a disk of insulative material that the anode 8 rests on. Another isolator 51 is placed around the anode 8. The bottom and side isolators 50 and 51 are conventionally formed of an electrically insulative material such as Teflon. A tantalum anode 8 is placed on the isolator 50 and the side isolator 51. The isolators 50 and 51 function to hold the anode 8 in place and prevent the anode 8 from contacting the wall of the case 13. A third isolator 52 is placed on top of the anode 8. The lid 2 is secured to the case 13 and then the case 13 is filled with electrolyte 54. The lid 2 fits down inside the case 13, pressing firmly against the second isolator. The broad support provided by the cap 2 against the top isolator 52 provides substantially even support on the anode 8. A weld is then run along the edge of the case 13 and the cap 2. The cap 2 also contains an insulative glass seal 14. This seal 14 contains a lead tube 15, which allows a lead 16 to be passed from the anode 8 to the inside of the tube 15.

In the tantalum capacitor field there are several known conventional methods of filling capacitors of the type shown in FIG. 2 with electrolyte. One method is to utilize a vacuum to draw the electrolyte into the capacitor after the cap 2 is in place. After the capacitor is sealed with the cap 2, it is placed in a tub of electrolyte under vacuum. The vacuum forces the air out of the capacitor. When the vacuum is removed, the electrolyte flows into the case 13 through the lead tube 16, which is the only opening in to the capacitor. The lead tube 16 is then sealed with a weld. The capacitor may also be filled with electrolyte through an additional orifice designed to receive electrolyte. The orifice is then welded shut.

Electrolyte is consumed slowly over the life of a traditional electrolytic tantalum capacitor. Therefore, the more electrolyte that is available for use in the case, the longer the life of the capacitor will be. In the traditional capacitors, the cap or the combination of the cap and plug take up room inside the case, thereby reducing the amount of room available for electrolyte in the case.

DISCLOSURE OF THE INVENTION

The present invention may be readily adapted to a variety of capacitors, capacitor materials and methods of creating capacitors. Embodiments of the present invention may provide a longer lasting capacitor, a capacitor that is more resistant to shock and vibration, and a capacitor that is easier to manufacture, among other benefits.

The capacitor includes a case that contains an isolator. A tantalum anode may be placed on the isolator. A second isolator may then be placed on top of the anode. Both of the isolators may be formed from any material that does not conduct electricity and is resistant to electrolyte. The isolators may also be porous. The second isolator may also extend to the outer wall of the cap in order to support the cap.

Next, a washer may be placed on top of the second isolator. The washer transfers compressive force from the capacitor cap to the anode. This force holds the anode firmly in place. The washer may be formed from metal or an otherwise substantially rigid material. It may be porous in order to allow better electrolyte flow into the capacitor. The washer may be beveled or rippled in order to add strength. The washer may also be integral with the capacitor cap. The washer may also be angled in such a way that the force is directed to the center of the anode.

A cap may then be placed on top of the case. The cap may have a toroidal shape with an outer annular wall and an inner annular wall, the inner and outer annular walls may be connected continuously along their top ends so that a top side of the toroidal shape is enclosed. The bottom side of the toroidal shape may have an opening which creates a cavity between the inner and outer annular walls. The cap may also have walls angled inward in order to transmit force to the anode when the cap is attached. It is possible that the washer and the cap may be integral and therefore placed in one step. The cap is then welded to the case.

The toroid shaped cap may have an electrically insulative glass seal at its center. The seal supports a lead tube, which provides a way for a lead to travel from the anode to the outside of the capacitor.

Once the case is assembled, the capacitor is filled with electrolyte. This may be done by placing the case in a tub of electrolyte under vacuum. The vacuum forces the air out of the capacitor and when the vacuum is removed, electrolyte flows into the capacitor through the lead tube tending to fill the case and may fill the cap cavity. The lead tube is then sealed with a weld.

This capacitor design has many innovations that provide advantages over conventional wet tantalum capacitors. The cap shape allows extra electrolyte, cathode material or other material beneficial to the operation of the capacitor (for example a hydrogen absorbent material like Tantalum) to fill the empty spaces in the cap, and also allows for the cap to be attached so that the weld can run along the top of the case. Running the weld along the top of the case means that the assembly process for this capacitor is easily automated. Many conventional capacitors have a weld that runs around the side of the capacitor case. In order to create this weld, the case must either be turned on its side or the welding device must approach the case horizontally and then the case or the welding device must rotate and no more than one capacitor can be welded at a time. Embodiments of the present invention may include a weld that runs around the top and therefore the welding device approaches vertically and simply makes a circle around the top of the case. This allows an entire tray of capacitors to be welded while in the tray instead of welding each capacitor individually. The washer provides added strength to the capacitor to withstand external force and better supports the tantalum anode. The cap design also creates more room for electrolyte or other material in the case, prolonging the life of the capacitor.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings, where like designations denote like elements, and:

FIG. 1 is a first prior art diagram of an electrolytic capacitor;

FIG. 2 is a second prior art diagram of an electrolytic capacitor;

FIG. 3 is a diagram of an electrolytic capacitor configured according to an embodiment of the invention;

FIG. 4 is a diagram of the electrolytic capacitor of FIG. 3 with the cap separated from the canister;

DESCRIPTION OF THE INVENTION

It will be understood by those of ordinary skill in the art that the invention is not limited to the specific components and assembly procedures disclosed herein. Many additional components and assembly procedures known in the art consistent with the intended capacitor and/or assembly procedures for a capacitor will become apparent for use with embodiments of the present invention from the disclosure herein. Accordingly, for example, although particular hardware is disclosed, such hardware and implementing components may comprise any shape, size, style, type, model, version, measurement, concentration, material, quantity, and/or the like as is known in the art for such hardware and implementing components, consistent with the intended operation of assembling a capacitor. It will also be understood by those of ordinary skill in the art that the invention is not limited to use of any specific components, provided that the components selected are consistent with the intended capacitor and/or method of assembling a capacitor.

Figure 5:
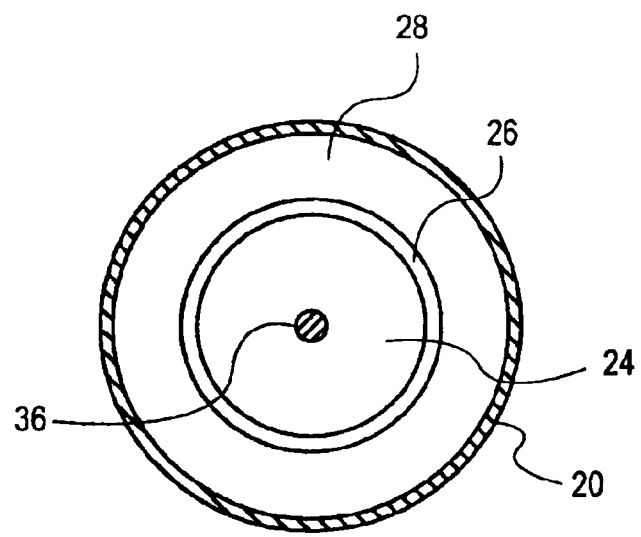
FIG. 5 is a diagram of the inside of an electrolytic capacitor showing the washer configured according to an embodiment of the invention.

In an embodiment of the present invention as illustrated in FIGS. 3 and 5, a porous tantalum anode 24 is contained in a case 20. By convention, the case 20 may be cylindrical with one closed end and one open end. The case 20, however, may also be any cross-sectional shape desired, so long as the shape does not interfere with the operation of the capacitor 18. The case 20 may be formed from a metal, such as tantalum, silver or any other electrically conductive material for use as a cathode connection and container for the capacitor 18 that does not react with the electrolyte 38, and can protect the components within the case 20.

Figure 6:
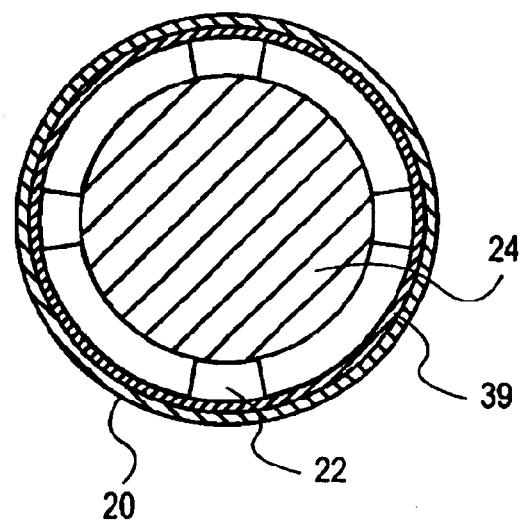
FIG. 6 is a diagram of the inside of an electrolytic capacitor showing the isolator configured according to an embodiment of the invention.
Figure 7:
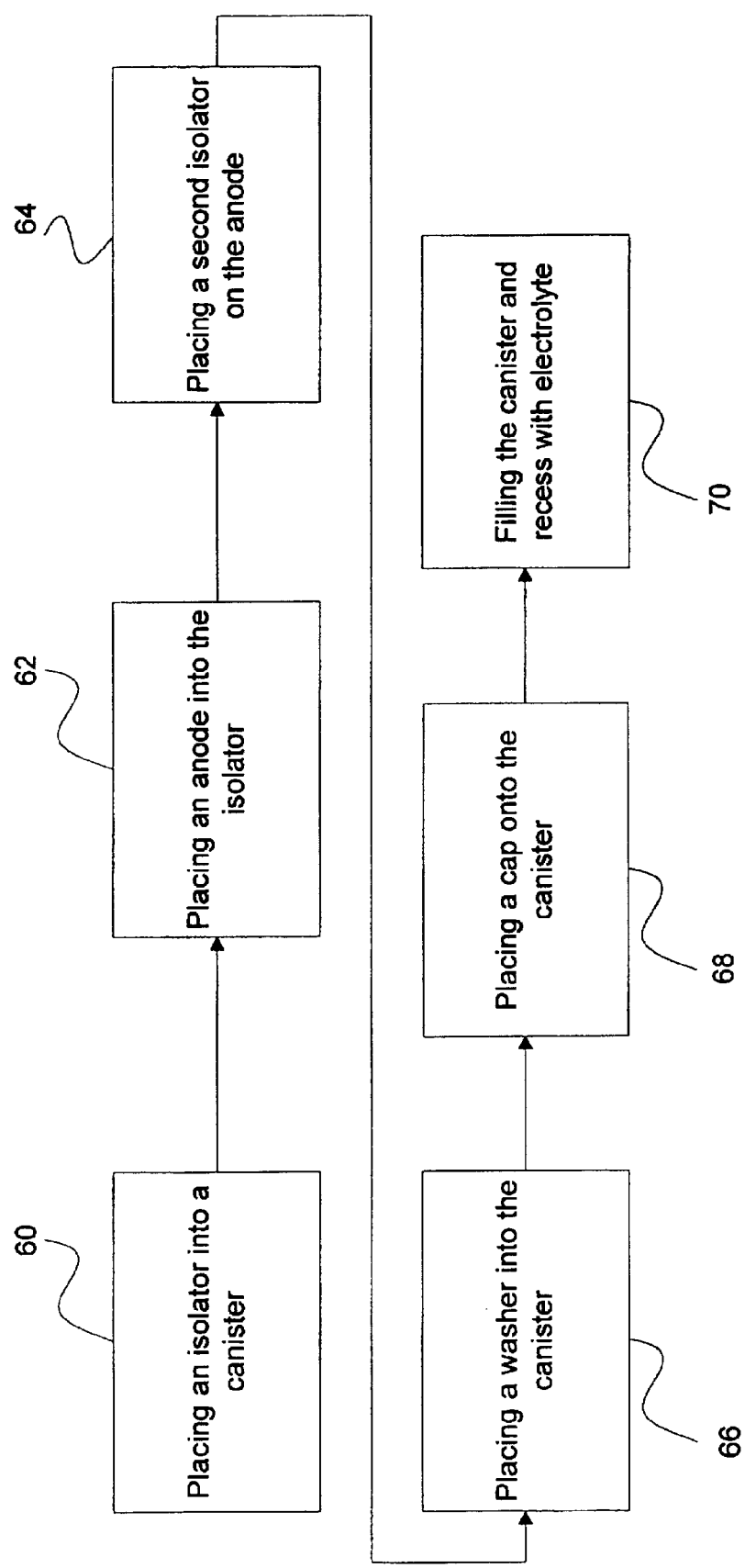
FIG. 7 is a flow diagram illustrating a method of constructing an electrolytic capacitor according to an embodiment of the invention.

An isolator 22, as shown in FIGS. 3, 4 and 6, may be placed in the case 20 (Step 60, FIG. 7). One embodiment of the present invention utilizes an isolator 22 with a flat section surrounded by legs that are placed so that they may receive a tantalum anode 24 therebetween. The isolator 22 serves to insulate the anode 24 from the walls of the case 20. The isolator 22 may be formed in any shape that serves to separate and support the anode 24. For example, the isolator 22 may form a cup that surrounds the anode 24, or even simply a flat member underneath the anode 24. The isolator 22 may be formed from any material that is electrically insulative and resistant to the electrolyte 38 that is placed around it. Teflon is commonly used as isolator 22 material for tantalum capacitors because it not only does not react with the electrolyte 38, it is also somewhat resilient, which tends to dampen forces applied to the capacitor 18 and reduces the likelihood of damage to the anode 24.

The anode 24 is placed on the isolator 22 in the case 20 (Step 62, FIG. 7). The anode 24 used in the embodiment of the invention shown in FIG. 3 is a porous tantalum pellet.

Extra cathode material 39 may also be added to the case 20. This cathode material 39 is formed in a ring that fits loosely around the anode 24. The extra cathode material 39 is most often formed from pressed and centered tantalum like the anode 24, which also acts as the cathode for the capacitor. The extra cathode material 39, however, may be formed from any material that acts as a cathode for a tantalum capacitor.

A second isolator 26 may be placed on top of the anode 24 (Step 64, FIG. 7). This isolator 24 may have the same shape as the first isolator 22 or it may be a different shape. This second isolator 26, like the first isolator 22, should be formed from a material that is electrically insulative and resistant to electrolyte 38. Teflon works well.

A washer 28, shown in FIG. 4, may be placed on top of the second isolator 26 (Step 66, FIG. 7). The washer 28 is placed between the isolator 26 and a cap 30 that is later placed on the case 20. The washer 28 transfers pressure from the cap 30 to the isolator 26, holding the anode 24 firmly in place. The washer 28 may be much smaller than the Teflon plug in traditional capacitors and, therefore, it leaves much more room for an electrolyte 38 to fill in the case 20, and even allows electrolyte 38 to enter the cap 30 region. In one particular embodiment, the washer 28 is a flat round disk with a hole in the center. In another particular embodiment shown in FIG. 3, the washer 28 angles downward as it approaches the center of the capacitor 18. The downward angle directs the force transferred by the washer 28 from the cap 30 to the center of the anode 24, which provides better support to the anode 24. In another embodiment of the washer 28, strength-enhancing ripples in the washer 28 or bevels increase the washer's 28 strength. These additional features provide added strength to the washer 28 with very little, if any, added material. This also allows the washer 28, which takes up very little space in the case 20 to serve the supporting and force transferring functions of the Teflon plug. By taking up very little room, the washer 28 creates more space for the electrolyte 38, or other materials, in the capacitor 18 case 20. By allowing more room for electrolyte 38, this embodiment of the invention may create a capacitor 18 with a longer life. It is also contemplated that the washer 28 may be combined with the cap 26. This may be done by making the isolator 26 so that it extends to the outside wall of the cap 30 and so that it is integral with or rigidly coupled to the outside wall. The cap 30 may then be placed on the case 20, pushing down on the isolator 26. An isolator 26, however, is conventionally made of a resilient material such as Teflon and therefore does not have the strength of metal. The advantage to having a resilient isolator 26 and a rigid washer 28 separate is that the properties of both are obtained. The washer 28 may be made out of many different materials. The only requirements for washer 28 materials is that the material be resistant to electrolyte 38 and sufficiently rigid so as to transfer the force from the cap 30 to the anode 24. Tantalum, titanium, stainless steel and silver are all resistant to electrolyte 38 and may all be used as washer 28 material. Alternatively, the metallic washer 28 or a portion of the extended outer wall of the cap 30 may be coated with a Teflon layer to provide similar results.

The cap 30 (FIG. 3) may be placed on the capacitor 18 case 20 (Step 68 FIG. 7). The cap 30 may be shaped like a toroid with an outer 41 and an inner 40 annulus wall. The annulus walls 41, 40 may be connected at the top 42 and have one or more openings 44 at the bottom. This configuration will create a cavity in the cap 30. In other words, it may be an annular cap 30 with a 'U' shaped cross-section where the 'U' is facing downward. The center of the toroid may contain an insulative seal 32 of glass or other insulative material. This seal 32 provides electrical insulation and mechanical support for a lead tube 34. The lead tube 34 helps create a way for a lead 36 attached to the anode 24 to have access to the outside. The cap 30 diameter may be larger or smaller than the case 20 as long as the cap 30 fits inside the case 20. The cap 30 is fit into the case 20. A small weld extends along the top edge of the case 20 creating a hermetic seal. The cap 30 fitting within the case 20 allows for a weld to be created from the top of the case 20 rather than around the side. Welding from the top of the capacitor 20 rather than the side simplifies the welding process and enables manufacturers to even, for example, weld an entire tray of capacitors at a time.

The walls of the cap 30 may end with a slight inward curve 46. This curve 46 creates a small foot around the edge of the cap 30 that tends to put pressure on the washer 28 forcing the anode 24 into place. The cap 30 may be formed from many different materials. The materials should be resistant to the electrolyte 38 and have enough strength to provide protection to the capacitor 18. Possible materials for use on a tantalum capacitor 18 cap 30 include tantalum, titanium and silver.

A seal 32, which is normally created at the beginning of the cap 30 forming process, surrounds a lead tube 34 and is formed of an insulator such as glass. This hollow lead tube 34 creates an opening in the cap 30 of the capacitor 18 for a lead 36 wire attached to the anode 24 to pass outside of the case 20. The insulating seal 32 is placed around the lead tube 34 to electrically isolate the lead 36 and help keep the lead 36, which extends from the anode 24, from coming into contact with the cap 30 material.

The final step in assembling a capacitor 18, is to fill the case 20 with an electrolyte 38 (Step 70 FIG. 7). This may be done by placing the capacitor 18 assembly in a vat of electrolyte 38 which is all placed in a vacuum chamber. The vacuum forces the air out of the case 20. When the vacuum is removed, the electrolyte 38 flows through the lead tube 34 into the case 20 to fill the void space in the case 20 and the cavity in the cap 30. A small weld may be placed on the end of the lead tube 34, which seals as well as electrically connects the lead 36 and the tube 34. The weld seals the capacitor 18 against the electrolyte 38 spilling out. The electrolyte 38 may be any of a number of well-known electrolytes known in the art for use with tantalum capacitors.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of the method of the present invention indicated herein are given as examples of possible steps or sequence of steps and not limitations, since numerous processes and sequences of steps may be used to employ this method of assembling a capacitor.

What is claimed is:

1. An electrolytic capacitor comprising:
  a cylindrical case;
  at least one tantalum pellet anode inside the case;
  at least one electrically insulative isolator between the case and the at least one tantalum pellet anode;
  a cap having a toroidal shape with an outer annular wall and an inner annular wall, the inner and outer annular walls being connected continuously along their top ends so that a top side of the toroidal shape is enclosed, a bottom side of the toroidal shape having an opening in spacial communication with a cavity between the inner and outer annular walls;
  an electrically insulative seal within a center portion of the toroid-shaped cap; and
  electrolyte contained in the case and the cap cavity.

2. The electrolytic capacitor of claim 1, wherein a first of the at least one isolators is on top of the anode and at least one washer is contacting both the first isolator and the cap.

3. The electrolytic capacitor of claim 2, wherein a bottom end of the outer cap wall is angled inward with respect to the outer wall and is configured to transmit a force from the cap to the tantalum pellet anode when the cap is attached.

4. The electrolytic capacitor of claim 2, wherein the at least one washer is integral with the cap.

5. The electrolytic capacitor of claim 2, wherein the at least one washer comprises metal.

6. The electrolytic capacitor of claim 2, wherein the at least one washer comprises porous material.

7. The electrolytic capacitor of claim 1, wherein a first of the at least one isolators is on top of the anode and the first isolator extends to the outside wall and transmits force from the outside wall to the isolator.

8. The electrolytic capacitor of claim 1, wherein the at least one isolator comprises porous material.

9. The electrolytic capacitor of claim 1, wherein the at least one isolator comprises Teflon.

10. An electrolytic capacitor comprising:

a case;

at least one tantalum pellet anode inside of the case;

at least one electrically insulative isolator between the case and the at least one tantalum pellet anode;

a cap having a toroidal shape with an outer annular wall and an inner annular wall, the inner and outer annular walls being connected continuously along their top ends so that a top side of the toroidal shape is enclosed;

an electrically insulative seal within a center portion of the toroid-shaped cap;

at least one washer contacting both the cap and at least one isolator, the at least one washer extending to and supporting the outer annular wall of the cap and being configured to transmit a force from the cap to the tantalum pellet anode when the cap is attached to the case; and electrolyte contained within the case.

11. The electrolytic capacitor of claim 10, wherein the toroid-shaped cap includes a cavity between the inner and outer annular walls and an opening in a bottom side of the toroidal shaped cap.

12. The electrolytic capacitor of claim 10, wherein the at least one washer is integral with the cap.

13. The electrolytic capacitor of claim 10, wherein the at least one washer has ripples along its radial width.

14. The electrolytic capacitor of claim 10, wherein the at least one washer is angled from an outer ring side to an inner ring side such that the outer ring side contacts the outer wall of the toroid-shaped cap and the inner ring side transmits the force to the tantalum pellet anode.

15. The electrolytic capacitor of claim 10, further comprising electrolyte within the toroidal-shaped cap.

16. The electrolytic capacitor of claim 10, further comprising cathode material within the toroidal-shaped cap.

17. The electrolytic capacitor of claim 10, further comprising hydrogen absorbent material within the toroidal-shaped cap.

* * * * *